US010923789B2

(12) United States Patent
Vasefi et al.

(10) Patent No.: US 10,923,789 B2
(45) Date of Patent: Feb. 16, 2021

(54) ENERGY STORAGE AND POWER SUPPLY SYSTEM WITH RESERVE MODE AND OVERRIDE

(71) Applicant: Goal Zero LLC, Bluffdale, UT (US)

(72) Inventors: Keyvan Vasefi, Payson, UT (US);
Norman L. Krantz, Draper, UT (US);
Walker Ford, Holladay, UT (US);
Sterling Robison, Cottonwood Heights, UT (US)

(73) Assignee: Goal Zero LLC, Bluffdale, UT (US)

( * ) Notice: Subject to any disclaimer, the term of this patent is extended or adjusted under 35 U.S.C. 154(b) by 0 days.

(21) Appl. No.: 16/450,593

(22) Filed: Jun. 24, 2019

(65) Prior Publication Data
US 2019/0312241 A1      Oct. 10, 2019

Related U.S. Application Data

(63) Continuation of application No. 15/661,403, filed on Jul. 27, 2017, now Pat. No. 10,403,866.
(Continued)

(51) Int. Cl.
| | |
|---|---|
| *H01M 2/10* | (2006.01) |
| *H02J 7/00* | (2006.01) |
| *H01M 50/20* | (2021.01) |
| *H01G 9/08* | (2006.01) |
| *H01M 10/0525* | (2010.01) |
| *H02H 3/027* | (2006.01) |

(Continued)

(52) U.S. Cl.
CPC ............. *H01M 50/20* (2021.01); *H01G 9/08* (2013.01); *H01M 10/0525* (2013.01); *H02H 3/027* (2013.01); *H02H 3/08* (2013.01); *H02H 3/087* (2013.01); *H02H 9/02* (2013.01); *H02J 1/00* (2013.01); *H02J 7/007* (2013.01); *H02J 7/0031* (2013.01); *H02J 7/0063* (2013.01); *H02J 1/082* (2020.01); *H02J 7/00304* (2020.01)

(58) Field of Classification Search
CPC .. H01M 2/1016; H01M 10/0525; H01M 2/10; H01G 9/08; H02H 3/027; H02H 3/08; H02H 3/087; H02H 9/02; H02J 1/00; H02J 7/0031; H02J 7/0063; H02J 7/007; H02J 1/082; H02J 7/00304; H02J 7/00; H02J 1/08
See application file for complete search history.

(56) References Cited

U.S. PATENT DOCUMENTS 6,081,104 A † 6/2000 Kern
8,080,972 B2   12/2011 Smith
(Continued)

FOREIGN PATENT DOCUMENTS

| WO | WO-2011/106431 A2 | 9/2011 |
|---|---|---|
| WO | WO-2017/118922 | 7/2017 |

*Primary Examiner* — Robert L Deberadinis
(74) *Attorney, Agent, or Firm* — Foley & Lardner LLP (57) ABSTRACT

An energy storage and power supply device includes an energy storage unit, an output coupled to the energy storage unit, and a processing circuit. The energy storage unit is configured to store electrical energy. The output is configured to facilitate providing power from the energy storage unit to a load. The processing circuit is configured to selectively restrict a power flow provided to the output by the energy storage unit in response to an operating characteristic of the energy storage and power supply device satisfying a threshold condition.

20 Claims, 4 Drawing Sheets

Related U.S. Application Data (60) Provisional application No. 62/368,147, filed on Jul. 28, 2016, provisional application No. 62/368,150, filed on Jul. 28, 2016, provisional application No. 62/368,135, filed on Jul. 28, 2016, provisional application No. 62/368,137, filed on Jul. 28, 2016, provisional application No. 62/368,136, filed on Jul. 28, 2016.

(51) Int. Cl.
*H02H 3/087* (2006.01)
*H02J 1/00* (2006.01)
*H02H 3/08* (2006.01)
*H02H 9/02* (2006.01)
*H02J 1/08* (2006.01)

(56) References Cited

U.S. PATENT DOCUMENTS

| | | |
|---|---|---|
| 8,081,410 B1 | 12/2011 | Wang et al. |
| 8,861,147 B2 † | 10/2014 | White |
| 9,024,570 B2 | 5/2015 | Workman et al. |
| 9,312,706 B2 | 4/2016 | Workman et al. |
| 9,385,351 B2 | 7/2016 | Workman et al. |
| 9,388,953 B2 | 7/2016 | Workman et al. |
| 9,515,500 B2 | 12/2016 | Workman et al. |
| 9,553,481 B2 | 1/2017 | Prommel et al. |
| 2003/0142449 A1 | 7/2003 | Iwata et al. |
| 2012/0127621 A1 | 5/2012 | Knapp et al. |
| 2013/0043826 A1 | 2/2013 | Workman et al. |
| 2015/0357613 A1 | 12/2015 | Sollanek |
| 2015/0380709 A1 | 12/2015 | Mizrahi |
| 2017/0040801 A1 | 2/2017 | Robison et al. |
| 2017/0040932 A1 | 2/2017 | Lillywhite et al. |
| 2017/0047755 A1 | 2/2017 | Workman et al. |

† cited by third party

ENERGY STORAGE AND POWER SUPPLY SYSTEM WITH RESERVE MODE AND OVERRIDE

CROSS-REFERENCE TO RELATED PATENT APPLICATIONS

This application is a continuation of U.S. patent application Ser. No. 15/661,403, filed Jul. 27, 2017, which claims the benefit of U.S. Provisional Patent Application No. 62/368,135, filed Jul. 28, 2016, U.S. Provisional Patent Application No. 62/368,136, filed Jul. 28, 2016, U.S. Provisional Patent Application No. 62/368,137, filed Jul. 28, 2016, U.S. Provisional Patent Application No. 62/368,147, filed Jul. 28, 2016, and U.S. Provisional Patent Application No. 62/368,150, filed Jul. 28, 2016, all of which are incorporated herein by reference in their entireties.

BACKGROUND

An energy storage and power supply device may be used to store power in an energy storage unit. The energy storage unit may store power provided to the energy storage and power supply device by a power supply device. The energy storage and power supply device may have a plurality of outputs that are coupled to the energy storage unit and provide power therefrom (e.g., to one or more external devices, etc.).

SUMMARY

One embodiment relates to an energy storage and power supply device. The energy storage and power supply device includes an energy storage unit, an output coupled to the energy storage unit, and a processing circuit. The energy storage unit is configured to store electrical energy. The output is configured to facilitate providing power from the energy storage unit to a load. The processing circuit is configured to selectively restrict a power flow provided to the output by the energy storage unit in response to an operating characteristic of the energy storage and power supply device satisfying a threshold condition.

Another embodiment relates to method for operating an energy storage and power supply device. The method includes monitoring, by a processing circuit, an operating characteristic of the energy storage and power supply device; and providing, by the processing circuit, a first signal to a first regulator of the energy storage and power supply device to limit a first power flow from an energy storage unit of the energy storage and power supply device to a first output of the energy storage and power supply device in response to the operating characteristic satisfying a first threshold value such that the energy storage and power supply device operates in the reserve mode.

Still another embodiment relates to a control system for an energy storage and power supply device. The control system includes a processing circuit. The processing circuit is configured to monitor an operating characteristic of the energy storage and power supply device and provide a reserve signal to a regulator positioned between an energy storage unit and an output of the energy storage and power supply device such that the regulator modulates a power flow provided to the output in response to the operating characteristic satisfying a threshold condition such that the energy storage and power supply device operates in a reserve mode.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Electrical energy may be transmitted from a power supply device to an energy storage and power supply device for storage in an energy storage unit (e.g., a battery including one or more cells, etc.). The electrical energy may be transmitted from the energy storage and power supply device to various load devices. By way of example, the energy storage and power supply device may include one or more outputs (e.g., ports, etc.) with which a load device interacts (e.g., using a power cable, etc.) to receive electrical energy.

The energy storage and power supply device (e.g., a processing circuit thereof, etc.) may be configured to enter a reserve mode of operation in response to a variation in the charge level of the energy storage unit (e.g., a variation in the available battery capacity, etc.). The energy storage and power supply device may be configured to monitor the charge level and/or the available battery capacity of the energy storage unit based on data provided by a charge sensor. The energy storage and power supply device may enter the reserve mode of operation in response to the charge level falling below a threshold value (e.g., a threshold voltage, etc.), in response to the charge level exceeding a threshold value (e.g., a threshold voltage, etc.), and/or in response to the charge level changing at a rate that exceeds a predetermined threshold rate. In one embodiment, the energy storage and power supply device additionally or alternatively enters the reserve mode of operation based on a charge rate and/or a discharge rate through one or more particular outputs (e.g., in response to a charge rate through an input interface exceeding a predetermined threshold rate, in response to a discharge rate through an output exceeding a predetermined threshold rate, etc.). In some embodiments, the energy storage and power supply device additionally or alternatively enters the reserve mode based on one or more (e.g., multiple, etc.) thresholds associated with at least one of a voltage level, a state-of-charge ("SOC") (e.g., a coulomb-counted SOC, etc.), a temperature (e.g., temperature of the energy storage unit, a temperature of an ambient environment, etc.), an amount of power draw, a run time, a time of day, among other conditions. The energy storage and power supply device may enter the reserve mode of operation and/or operate in various reserve modes of operation based on one or more conditions to provide one or more reserve sub-modes of operation (e.g., enter and/or operate in one reserve sub-mode of operation in response to voltage falling below a threshold and an amount of power draw exceeding a threshold level, enter and/or operate in another reserve sub-mode of operation in response to voltage falling below the threshold and an amount of power draw exceeding a second threshold level, etc.). Upon entering the reserve mode and/or a sub-mode of operation, the energy storage and power supply device may be configured to selectively vary (e.g., reduce, limit, throttle, terminate, increase, boost, allow, provide, etc.) the electrical power output at one or more of the outputs.

By way of example, the charge level of the energy storage unit may be depleted during use of the energy storage and power supply device. The energy storage and power supply device may enter the reserve mode and shut down one or more outputs when an operating characteristic of the energy storage and power supply device, such as the voltage on the energy storage unit, falls below a threshold level. The energy storage and power supply device may additionally or alternatively enter the reserve mode and shut down one or more outputs based on one or more (e.g., multiple, etc.) thresholds associated with at least one of a voltage level, a SOC (e.g., a coulomb-counted SOC, etc.), a temperature (e.g., temperature of the energy storage unit, a temperature of an ambient environment, etc.), an amount of power draw, a run time, and/or a time of day, among other conditions, relative to an associated threshold level. By way of another example, the charge level of the energy storage unit may be increased during a charging process. The energy storage and power supply device may enter the reserve mode and turn on one or more outputs when the voltage on the energy storage unit exceeds a threshold level. The energy storage and power supply device may additionally or alternatively enter the reserve mode and turn on one or more outputs based on one or more (e.g., multiple, etc.) thresholds associated with at least one of a voltage level, a SOC (e.g., a coulomb-counted SOC, a charge level, etc.), a temperature (e.g., temperature of the energy storage unit, a temperature of an ambient environment, etc.), an amount of power draw, a run time, and/or a time of day, among other conditions, relative to an associated threshold level.

In one embodiment, the energy storage and power supply device is configured to select one or more of the outputs at which to reduce electrical power output. In another embodiment, the energy storage and power supply device is configured to select one or more of the outputs at which to provide electrical power output. The energy storage and power supply device may be configured to additionally or alternatively determine a period of time that the electrical power may be provided at the one or more outputs. By way of example, the energy storage and power supply device may determine which ports may stay and/or become active and a period of time that the ports may stay and/or become active based on the charge level, the voltage level, the temperature, the power draw, the run time of the energy storage unit, the time of day, and/or another condition.

Figure 1:
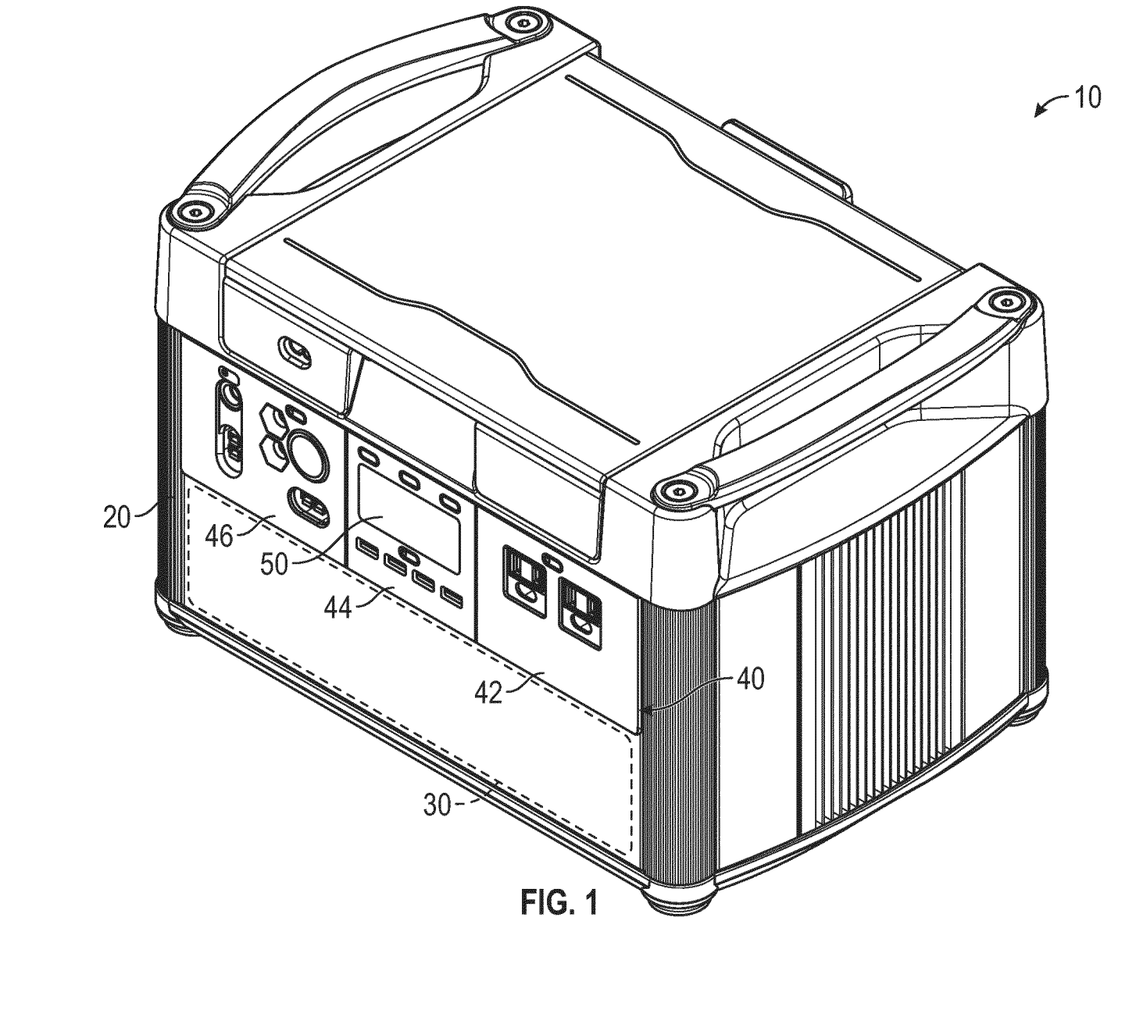
FIG. 1 is a front perspective view of an energy storage and power supply device, according to an exemplary embodiment.
Figure 2:
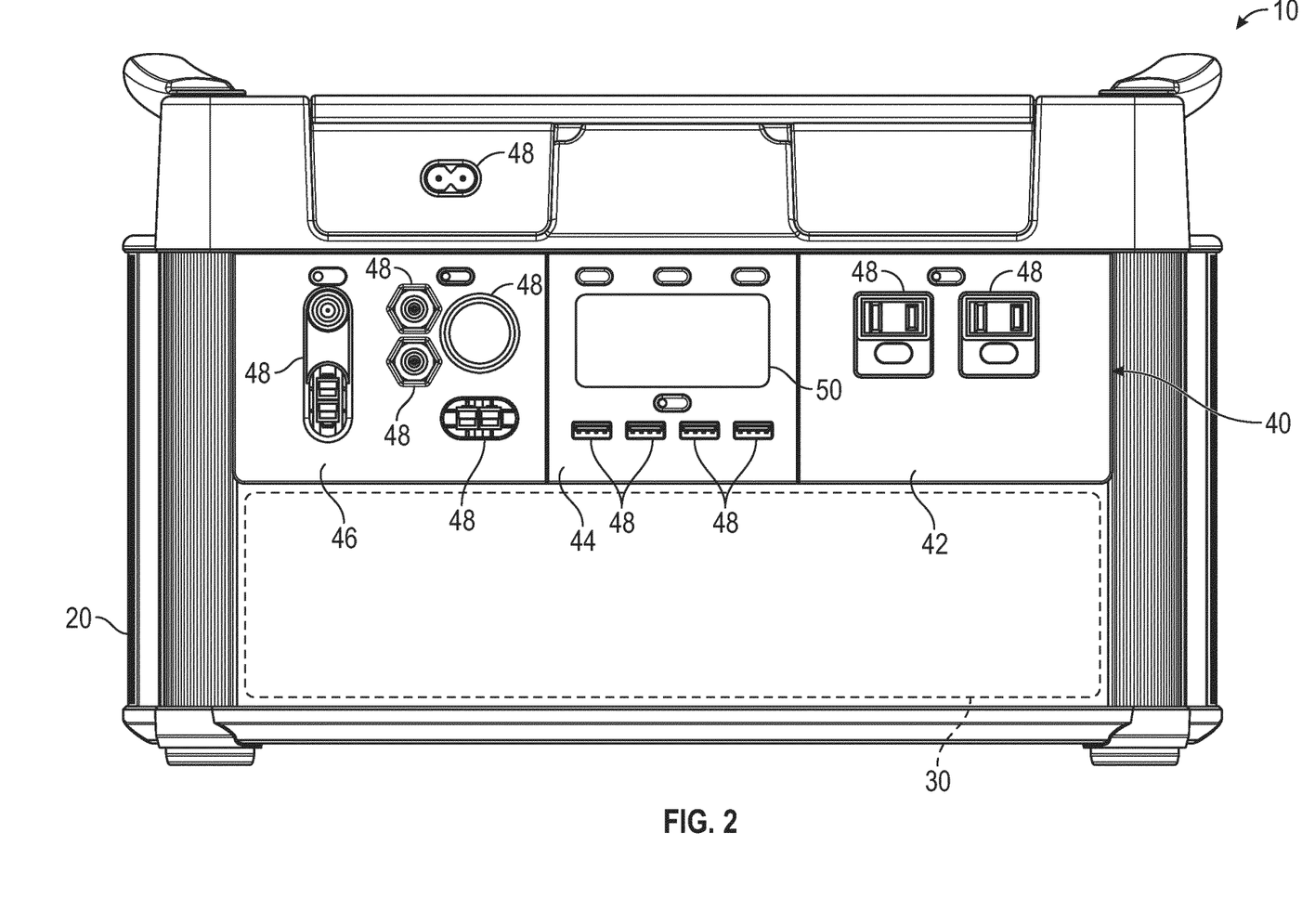
FIG. 2 is a front view of the energy storage and power supply device of FIG. 1, according to an exemplary embodiment.

According to the exemplary embodiment shown in FIGS. 1 and 2, an energy storage and power supply device (e.g., a solar generator, a hybrid combustion and solar generator, etc.), shown as energy storage and power supply device 10, is configured to receive and store electrical power from a power source for future use (e.g., in a remote location where electricity is not readily available, during a power outage, etc.). The power source may include a solar panel system, a combustion generator (e.g., a gasoline-fueled generator, etc.), a power supply (e.g., a 120 Volt ("V") wall charger, a 220 V wall charger, a 240 V wall charger, etc.), and/or a 12 V car adapter. The stored electrical power may be provided to a load device (e.g., a smartphone, a tablet, an E-reader, a computer, a laptop, a smartwatch, a portable and rechargeable battery pack, appliances, refrigerators, lights, display monitors, televisions, etc.) to at least one of charge and power the load device.

As shown in FIGS. 1 and 2, the energy storage and power supply device 10 includes a housing, shown as housing 20. As shown in FIGS. 1 and 2, the energy storage and power supply device 10 includes an energy storage unit, shown as battery 30. According to an exemplary embodiment, the housing 20 defines an internal cavity of the energy storage and power supply device 10 that receives the battery 30. The battery 30 may include one or more lithium-ion cells. In some embodiments, the battery 30 includes a plurality of batteries (e.g., two or more batteries connected in series, etc.). In some embodiments, the battery 30 additionally or alternatively includes another type of battery (e.g., a lead-acid battery, etc.) or energy storage unit (e.g., one or more capacitors, etc.).

As shown in FIGS. 1 and 2, the energy storage and power supply device 10 includes an interface, shown as user interface 40. As shown in FIG. 2, the user interface 40 includes a first portion, shown as first panel 42, a second portion, shown as second panel 44, and a third portion, shown as third panel 46. As shown in FIG. 2, the first panel 42 includes a first plurality of interfaces, the second panel 44 includes a second plurality of interfaces, and the third panel 46 includes a third plurality of interfaces, shown as input/output ("I/O") ports 48. The I/O ports 48 are electrically coupled to the battery 30, according to an exemplary embodiment. According to an exemplary embodiment, (i) at least a portion of the I/O ports 48 are configured to receive electrical energy from a power source (e.g., a solar panel system, a combustion generator, a power supply, a 12 V car adapter, etc.) for storage by the battery 30, (ii) at least a portion of the I/O ports 48 are configured to provide the stored electrical energy within the battery 30 to a load device (e.g., a smartphone, a tablet, an E-reader, a computer, a laptop, a smartwatch, a portable and rechargeable battery pack, appliances, a refrigerator, lights, display monitors, televisions, etc.) with a power and/or charging cable connected therebetween, and/or (iii) at least a portion of the I/O ports 48 are configured to receive and provide electrical energy (e.g., operate as dual functioning ports, etc.).

According to the exemplary embodiment shown in FIG. 2, the I/O ports 48 of the first panel 42, the second panel 44, and the third panel 46 include alternating current ("AC") inverter ports (e.g., having a 110 V outlet port, etc.), direct current ("DC") inputs and/or outputs, USB ports, a 6 millimeter ("mm") port, a 12 V car port, a 12 V powerpole port (e.g., an Anderson Powerpole, etc.), a charging port (e.g., a solar panel charging port, a combustion generator charging port, a power supply charging port, a powerpole charging port, etc.), and/or a chaining port (e.g., to electrically couple two or more of the energy storage and power supply devices 10 in series or parallel, a powerpole chaining port, etc.).

As shown in FIG. 2, the second panel 44 includes a display, shown as display 50. The display 50 may provide various information regarding the state and/or operation of the energy storage and power supply device 10 and/or the battery 30 (e.g., a battery level, a current input power, a current input voltage, a current input current, a current output power, a current output voltage, a current output current, an estimated time until a full charge of the battery 30 is reached, an estimated time until full and/or permitted depletion of the battery 30 is reached, a battery temperature, an insignia, a notification, a warning, etc.).

Figure 3:
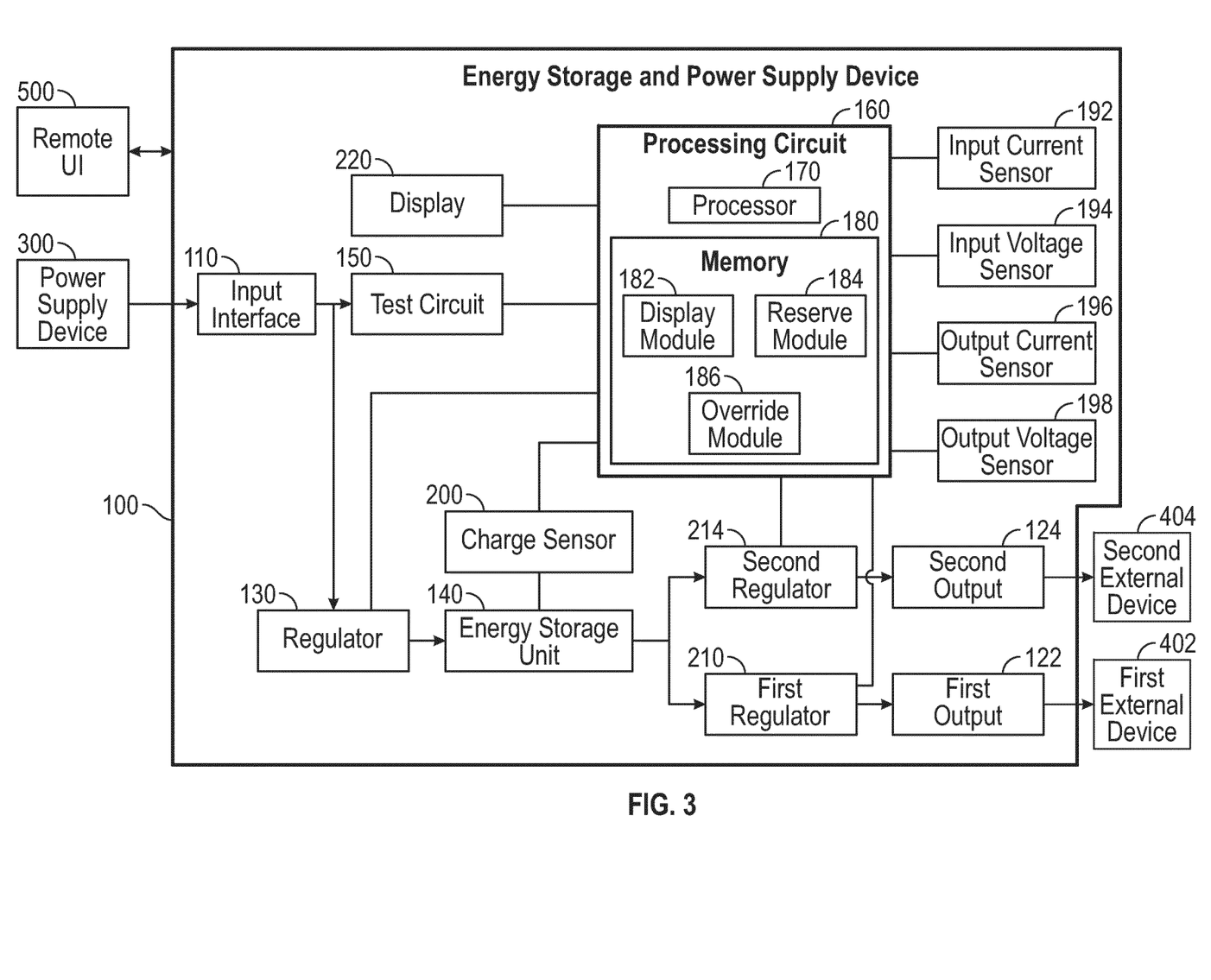
FIG. 3 is a schematic diagram of the energy storage and power supply device of FIG. 1, coupled to a power supply device and an external device, according to an exemplary embodiment.

According to the exemplary embodiment shown in FIG. 3, an energy storage and power supply device 100 (e.g., the energy storage and power supply device 10, etc.) is configured to receive electrical power from a device, shown as power supply device 300. The power supply device 300 may be a photovoltaic cell, an array of photovoltaic cells (e.g., solar panel, etc.), a generator (e.g., a combustion generator, etc.), a wall charger, and/or an energy storage unit (e.g., a battery, a capacitor, etc.), among other alternatives. The energy storage and power supply device 100 includes an input, shown as input interface 110, a first output, shown as first output 122, and a second output, shown as second output 124. In some embodiments, the energy storage and power supply device 100 includes additional or fewer outputs. Any of the I/O ports 48 may provide electrical energy to and/or receive electrical energy from the input interface 110, the first output 122, and/or the second output 124. The input interface 110 is configured to receive electrical energy from the power supply device 300. The first output 122 and the second output 124 are configured to transmit electrical energy to a plurality of devices (e.g., a phone, a tablet, a computer, a portable and rechargeable battery pack, etc.), shown as first external device 402 and second external device 404. The first external device 402 and the second external device 404 may be at least one of charged and powered by the energy storage and power supply device 100. The first external device 402 and the second external device 404 may be the same type of device, different types of devices, and/or the same device (e.g., selectively coupled with either or both of the first output 122 and the second output 124.

According to the exemplary embodiment shown in FIG. 3, the energy storage and power supply device 100 includes a regulator (e.g., a switching regulator, etc.), shown as regulator 130, and an energy storage unit (e.g., the battery 30, a capacitor, etc.), shown as energy storage unit 140. The regulator 130 may be configured to alter a voltage provided at the input interface 110 for application to the energy storage unit 140. In other embodiments, the energy storage and power supply device 100 does not include the regulator 130. The energy storage unit 140 may include one or more lithium-ion cells. In other embodiments, the energy storage unit 140 is or includes another device configured to store energy.

According to the exemplary embodiment shown in FIG. 3, the input interface 110 is coupled to a circuit, shown as test circuit 150. The test circuit 150 may draw current from the power supply device 300 in a variable manner. In other embodiments, the energy storage and power supply device 100 does not include the test circuit 150.

As shown in FIG. 3, the energy storage and power supply device 100 includes a processing circuit 160. The processing circuit 160 is coupled to various components of the energy storage and power supply device 100. In one embodiment, the processing circuit 160 is configured to send and receive information (e.g., current data, voltage data, electrical power data, commands, charge data, run time data, temperature data, coulomb-counted SOC, etc.) to and/or from various components of the energy storage and power supply device 100.

According to an exemplary embodiment, the processing circuit 160 is coupled to the regulator 130 and the test circuit 150. In one embodiment, the processing circuit 160 is configured to provide commands to the test circuit 150 such that the test circuit 150 draws more or less current from the power supply device 300 and thereafter determine a maximum available input power associated with the power supply device 300. The processing circuit 160 may be configured to control the charging power applied to the energy storage unit 140 (e.g., by controlling the regulator 130, etc.), control the output power at the first output 122 (e.g., by controlling the regulation of the voltage at the first output 122, etc.), and/or control the output power at the second output 124 (e.g., by controlling the regulation of the voltage at the first output 122, etc.) such that the charging power and/or the output power approach or equal the maximum available input power associated with the power supply device 300.

The processing circuit 160 includes a processor, shown as processor 170, and a memory (e.g., RAM, ROM, Flash Memory, hard disk storage, etc.), shown as memory 180. The processor 170 may be implemented as a general-purpose processor, an application specific integrated circuit ("ASIC"), one or more field programmable gate arrays ("FPGAs"), a digital signal processor ("DSP"), a group of processing components, or other suitable electronic processing components. The memory 180 may include multiple memory devices. The memory 180 may store data and/or computer code for facilitating the various processes described herein. Thus, the memory 180 may be communicably connected to the processor 170 and provide computer code or instructions to the processor 170 for executing the processes described in regard to the processing circuit 160 herein. Moreover, the memory 180 may be or include tangible, non-transient volatile memory or non-volatile memory. Accordingly, the memory 180 may include database components, object code components, script components, or any other type of information structure for supporting the various activities and information structures described herein.

The memory 180 includes various modules for completing the activities described herein. According to an exemplary embodiment, the processing circuit 160 includes a first module, shown as display module 182, a second module, shown as reserve module 184, and a third module, shown as override module 186. In other embodiments, the processing circuit 160 includes additional, fewer, and/or different modules. The display module 182, the reserve module 184, and/or the override module 186 may be configured to receive inputs relating to various data and/or information (e.g., current data, voltage data, electrical power data, etc.) and provide output signals. In one embodiment, the processing circuit 160 analyzes the output signals (e.g., with the processor 170, etc.) and controls one or more components of the energy storage and power supply device 100.

The processing circuit 160 is coupled to a number of sensors (e.g., gauges, meters, etc.), according to the exemplary embodiment shown in FIG. 3. The sensors may be associated with the input interface 110, the first output 122, the second output 124, the energy storage unit 140, the power supply device 300, the first external device 402, and/or the second external device 404. According to the exemplary embodiment shown in FIG. 3, the processing circuit 160 is coupled to a first sensor, shown as input current sensor 192 (e.g., positioned to monitor a current of the electrical power provided to the input interface 110 from the power supply device 300, etc.), a second sensor, shown as input voltage sensor 194 (e.g., positioned to monitor a voltage of the electrical power provided to the input interface 110 from the power supply device 300, etc.), a third sensor, shown as output current sensor 196 (e.g., positioned to monitor a current of the electrical power provided to the first output 122, the second output 124, the first external device 402, and/or the second external device 404, etc.), and a fourth sensor, shown as output voltage sensor 198 (e.g., positioned to monitor a voltage of the electrical power provided to the first output 122, the second output 124, the first external device 402, and/or the second external device 404, etc.). In other embodiments, the processing circuit 160 includes a different combination of sensors and/or still other types of sensors. By way of example, the processing circuit 160 may include and/or be coupled to a temperature sensor (e.g., to acquire temperature data indicative of a temperature of the energy storage unit 140 and/or other portion of the energy storage and power supply device 10 and/or an external temperature, etc.), a timer (e.g., to acquire run time data, etc.), and/or still other sensors to acquire data regarding various operating characteristics of the energy storage and power supply device 10. In still other embodiments, the processing circuit 160 includes a combination of electrical components (e.g., diodes, resistors, capacitors, etc.) that replace and/or supplement at least one of the input current sensor 192, the input voltage sensor 194, the output current sensor 196, and the output voltage sensor 198.

As shown in FIG. 3, the energy storage and power supply device 100 includes a charge sensor, shown as charge sensor 200. In one embodiment, the charge sensor 200 is configured to provide data relating to a charge level and/or an available battery capacity of the energy storage unit 140 (i.e., a SOC of the energy storage unit 140). The charge sensor 200 includes a voltage sensor configured to measure the voltage on the one or more cells of the energy storage unit 140 and provide voltage data to the processing circuit 160, according to an exemplary embodiment. In some embodiments, the voltage data is related to (e.g., directly indicative of, etc.) the charge level and/or the available battery capacity of the energy storage and power supply device 100. In other embodiments, the charge sensor 200 is another device.

In one embodiment, the energy storage and power supply device 100 includes one or more regulators configured to selectively vary the electrical power provided at the first output 122 and/or the second output 124. In one embodiment, the processing circuit 160 is coupled to the one or more regulators and configured to control the one or more regulators to vary the electrical power provided at the one or more outputs of the energy storage and power supply device 100. The one or more regulators may be configured to selectively vary the voltage provided at the first output 122 and/or the second output 124 and thereby selectively vary the electrical power provided at the first output 122 and/or the second output 124 (e.g., the first external device 402 and/or the second external device 404 may draw more or less current in response to an increase or decrease in the voltage at the first output 122 and the second output 124, respectively, etc.). By way of example, the one or more regulators may include a switching regulator configured to selectively terminate and/or allow the flow of current to the first output and/or the second output 124. Additionally or alternatively, the one or more regulators may be configured to selectively vary the current provided at the first output 122 and/or the second output 124. By way of example, the one or more regulators may include a switch configured to selectively terminate and/or facilitate the flow of current to the first output 122 and/or the second output 124.

According to the exemplary embodiment shown in FIG. 3, the energy storage and power supply device 100 includes a first regulator, shown as first regulator 212, and a second regulator, shown as second regulator 214. The first regulator 212 and/or the second regulator 214 may be configured to selectively vary the electrical power provided at the first output 122 and the second output 124, respectively. As shown in FIG. 3, the first regulator 212 is positioned along a first power flow path between the energy storage unit 140 and the first output 122, and the second regulator 214 is positioned along a second power flow path between the energy storage unit 140 and the second output 124. In other embodiments, the energy storage and power supply device 100 includes more or fewer regulators (e.g., one regulator configured to selectively vary the electrical power provided at multiple outputs, a number of regulators that equal and/or correspond with a number of outputs, etc.).

According to an exemplary embodiment, the reserve module 184 is configured to evaluate data provided by the charge sensor 200 and determine a charge level of the energy storage unit 140. In one embodiment, the reserve module 184 is configured to monitor the charge level of the energy storage unit 140. In some embodiments, the reserve module 184 is configured to evaluate data provided by the temperature sensor, the timer, the input current sensor 192, the input voltage sensor 194, the output current sensor 196, and/or the output voltage sensor 198 to determine one or more operating characteristics of the energy storage and power supply device 10 including a voltage, a power draw, a power input, a run time, and/or a temperature associated with the energy storage unit 140, among other alternatives. The reserve module 184 is configured to provide a reserve mode of operation for the energy storage and power supply device 100, according to an exemplary embodiment.

In one embodiment, the reserve module 184 is configured to enter the reserve mode of operation in response to (i) an operating characteristic including the charge level, the voltage, the power draw, the power input, the temperature, and/or the run time of the energy storage unit 140 satisfying (e.g., falling below, exceeding, etc.) a threshold value (e.g., falling below a threshold charge level, falling below a threshold voltage, exceeding a threshold temperature, exceeding a threshold run time, etc.) and/or (ii) the time of day satisfying a threshold value (e.g., surpassing a threshold time of day, night time, etc.). By way of example, the energy storage unit 140 may be charged to an initial voltage (e.g., 12.6 V, etc.). The energy storage unit 140 may be battery system configured to operate at a nominal voltage of 12 V (e.g., operate at a voltage of 9-12.6 V, etc.). The voltage at the energy storage unit 140 may decrease during use of the energy storage and power supply device 100 as electrical power is provided at the first output 122 and/or the second output 124. The reserve module 184 may be configured to monitor the voltage of the energy storage unit 140 and enter the reserve mode in response to the voltage at the energy storage unit 140 (e.g., as measured by the charge sensor 200, etc.) falling below a threshold voltage (e.g., 10.5 V, etc.). The reserve module 184 may be configured to additionally or alternatively enter the reserve mode based on at least one of the charge level, the power draw, the temperature, the run time, the time of day, and/or another condition relative to respective thresholds. The reserve module 184 may thereby be configured to enter various reserve modes and/or sub-modes based on various combinations of the voltage, the charge level, the power draw, the power input, the temperature, the run time, the time of day, and/or another condition. The various reserve modes and/or sub-modes may define different operational parameters for the energy storage and power supply device 100 (e.g., which output ports to deactivate, how many output ports to deactivate, each of the various reserve sub-modes may define a number of output ports and/or specific output ports that are to be deactivated once an associated scenario defined by one or more of the reserve sub-modes is present, etc.). The energy storage and power supply device 100 may thereby be configured to limit one or more outputs to provide different output mode configurations in various reserve modes of operation.

Upon entering the reserve mode, the reserve module 184 may provide commands in response to which the processing circuit 160 is configured to engage the first regulator 212 and/or the second regulator 214 to reduce, limit, throttle, terminate, etc. the power provided at the first output 122 and/or the second output 124. By way of example, the first output 122 may be coupled to a car adapter (e.g., a cigarette lighter outlet, etc.), and the second output 124 may be coupled to a USB port. The processing circuit 160 may be configured to engage the first regulator 212 to terminate the power to the first output 122 in response to the voltage at the energy storage unit 140 falling below the threshold value (e.g., 10.5 V, etc.) while continuing to provide power at the second output 124. Such control may terminate the power provided at the car adapter (e.g., terminating the flow of power to devices requiring, expecting, and/or configured to receive greater voltages, etc.) while still providing power to the USB port (e.g., allowing the use of the energy storage and power supply device 100 to charge and/or power cell phones or other devices that may utilize a lower-voltage input, etc.).

In one embodiment, the processing circuit 160 is configured to selectively reduce, limit, throttle, terminate, etc. the power provided at one or more of the other outputs (e.g., by engaging one or more regulators, etc.) in response to the charge level of the energy storage unit 140 falling below a second threshold value. The first threshold value and/or the second threshold value may be stored in memory 180. By way of example, the processing circuit 160 may be configured to terminate the power to the first output 122 in response to the voltage at the energy storage unit 140 falling below the first threshold value (e.g., 10.5 V, etc.) and additionally terminate the power to the second output 124 in response to the voltage at the energy storage unit 140 falling below the second threshold value (e.g., 9 V, etc.). The processing circuit 160 may be configured to facilitate power output from one or more outputs within a voltage range (e.g., 9-12.6 V, etc.). The processing circuit 160 may thereby be configured to facilitate use of certain outputs (e.g., all of the outputs of the energy storage and power supply device 100, etc.) within one range (e.g., 10.5-12.6 V, etc.) and a different set (e.g., a subset, etc.) of the outputs when the voltage at the energy storage unit 140 is within a second range (e.g., 9-10.5 V, etc.). Control within other ranges is possible. The ranges may be tailored to specific outputs and may or may not overlap, according to various embodiments. Such control may protect the energy storage unit 140 from damage that may be caused by over-depletion (e.g., increasing the cycle count and/or operational life of the energy storage and power supply device 100, etc.).

By way of another example, the processing circuit 160 may be configured to terminate the power to a first group of output ports in response to at least one of the voltage, the charge level, the power draw, the power input, the temperature, the run time, the time of day, and/or another condition satisfying thresholds associated with a first reserve sub-mode. The processing circuit 160 may be configured to terminate the power to the first group and/or a second group of output ports in response to at least one of the voltage, the charge level, the power draw, the power input, the temperature, the run time, the time of day, and/or another condition satisfying thresholds associated with a second reserve sub-mode. The processing circuit 160 may be configured to terminate the power to the first group, the second group, and/or a third group of output ports in response to at least one of the voltage, the charge level, the power draw, the power input, the temperature, the run time, the time of day, and/or another condition satisfying associated thresholds associated with a third reserve sub-mode, etc. The groups of outputs may each include one or more outputs. The groups of outputs may be distinct sets of outputs or overlapping in one or more regards (e.g., one output may be in the first group of outputs and in the second group of outputs, etc.).

In another embodiment, the reserve module 184 is configured to enter the reserve mode of operation in response to (i) an operating characteristic including the charge level, the voltage, the power draw, the power input, the temperature, an off time, and/or another condition of the energy storage unit 140 satisfying a threshold value (e.g., exceeding a threshold charge level, exceeding a threshold voltage, falling below a threshold temperature, exceeding a threshold off time, etc.) and/or (ii) the time of day satisfying a threshold value (e.g., surpassing a time of day threshold, daytime, etc.). By way of example, the energy storage unit 140 may be depleted to an initial voltage (e.g., 7 V, etc.) and thereafter charged (e.g., using the power supply device 300, etc.). The voltage at the energy storage unit 140 may increase during a charging process. By way of example, the energy storage unit 140 may be battery system configured to operate at a nominal voltage of 12 V (e.g., operate at a voltage of 9-12.6 V, etc.). The reserve module 184 may be configured to monitor the voltage of the energy storage unit 140 and enter the reserve mode in response to the voltage at the energy storage unit 140 (e.g., as measured by the charge sensor 200, etc.) exceeding a threshold voltage (e.g., 9 V, etc.). The reserve module 184 may be configured to additionally or alternatively enter the reserve mode based on at least one of the charge level, the power draw, the power input, the temperature, the off time, the time of day, and/or another condition relative to respective thresholds. The reserve module 184 may thereby be configured to enter various reserve sub-modes based on various combinations of the voltage, the charge level, the power draw, the power input, the temperature, the off time, the time of day, and/or another condition. The various reserve sub-modes may define different operational parameters for the energy storage and power supply device 100 (e.g., which output ports to activate, how many output ports to activate, each of the various reserve sub-modes may define a number of output ports and/or specific output ports that are to be activated once an associated scenario defined by one or more of the reserve sub-modes is present, etc.).

Upon entering the reserve mode, the reserve module 184 may provide commands in response to which the processing circuit 160 is configured to engage the first regulator 212 and/or the second regulator 214 to increase, boost, allow, provide, etc. power at the first output 122 and/or the second output 124. By way of example, the first output 122 may be coupled to a car adapter (e.g., a cigarette lighter outlet, etc.), and the second output 124 may be coupled to a USB port. The processing circuit 160 may be configured to engage the second regulator 214 to provide power to the second output 124 in response to the voltage at the energy storage unit 140 exceeding the second threshold value (e.g., 9 V, etc.) while continuing to prohibit power at the first output 122. Such control may not provide power at the car adapter (e.g., preventing the flow of power to devices requiring, expecting, and/or configured to receive greater voltages, etc.) while still providing power to the USB port (e.g., allowing the use of the energy storage and power supply device 100 to charge and/or power cell phones or other devices that may utilize a lower-voltage input, etc.).

In one embodiment, the processing circuit 160 is configured to selectively increase, boost, allow, provide, etc. power at the second output 124 and/or one or more of the other outputs (e.g., by engaging one or more regulators, etc.) in response to the charge level of the energy storage unit 140 exceeding the first threshold value. The first threshold value and/or the second threshold value may be stored in memory 180. By way of example, the processing circuit 160 may be configured to provide power to the second output 124 in response to the voltage at the energy storage unit 140 exceeding the second threshold value (e.g., 9 V, etc.) and additionally provide power to the first output 122 in response to the voltage at the energy storage unit 140 exceeding the first threshold value (e.g., 10.5 V, etc.). The processing circuit 160 may be configured to facilitate power output from one or more outputs within a voltage range (e.g., 9-12.6 V, etc.). The processing circuit 160 may thereby be configured to facilitate use of certain outputs (e.g., all of the outputs of the energy storage and power supply device 100, etc.) within one range (e.g., 10.5-12.6 V, etc.) and a different set (e.g., a subset, etc.) of the outputs when the voltage at the energy storage unit 140 is within a second range (e.g., 9-10.5 V, etc.). Control within other ranges is possible. The ranges may be tailored to specific outputs and may or may not overlap, according to various embodiments. Such control may protect the energy storage unit 140 from damage that may be caused by over-depletion.

By way of another example, the processing circuit 160 may be configured to provide the power to a first group of output ports in response to at least one of the voltage, the charge level, the power draw, the power input, the temperature, the run time, the time of day, and/or another condition satisfying thresholds associated with a first reserve sub-mode. The processing circuit 160 may be configured to provide the power to the first group and/or a second group of output ports in response to at least one of the voltage, the charge level, the power draw, the power input, the temperature, the run time, the time of day, and/or another condition satisfying thresholds associated with a second reserve sub-mode. The processing circuit 160 may be configured to provide the power to the first group, the second group, and/or a third group of output ports in response to at least one of the voltage, the charge level, the power draw, the power input, the temperature, the run time, the time of day, and/or another condition satisfying associated thresholds associated with a third reserve sub-mode, etc. The groups of outputs may each include one or more outputs. The groups of outputs may be distinct sets of outputs or overlapping in one or more regards (e.g., one output may be in the first group of outputs and in the second group of outputs, etc.).

In some embodiments, the reserve module 184 is configured to enter the reserve mode of operation additionally or alternatively in response to a rate that power is going out through the first output 122 and/or the second output 124 (individually or collectively) exceeding a predetermined threshold rate. By way of example, a load coupled to the first output 122 and/or the second output 124 may draw power at a constant rate or a variable rate. The constant rate or the variable rate may exceed the predetermined threshold rate during use of the energy storage and power supply device 100. In one embodiment, the reserve module 184 is configured to monitor the rate that power is going out through the first output 122 and/or the second output 124 (e.g., calculated by the reserve module 184 based on data received from the one or more output current sensors 196 and/or the one or more output voltage sensors 198, etc.) and enter the reserve mode in response to the rate exceeding a predetermined threshold rate (e.g., 1,000 Watts, etc.).

Upon entering the reserve mode, the reserve module 184 may provide commands in response to which the processing circuit 160 is configured to engage the first regulator 212 and/or the second regulator 214 to reduce, limit, throttle, terminate, etc. the power provided at the first output 122 and/or the second output 124. By way of example, the first output 122 may be coupled to an AC inverter port, and the second output 124 may be coupled to a USB port. The processing circuit 160 may be configured to engage the first regulator 212 to terminate the power to the first output 122 in response to the rate that power is going out through the first output 122 (individually or collectively with the rate that power is going out through the second output 124) exceeding a predetermined threshold rate (e.g., 1,000 Watts, etc.) while continuing to provide power at the second output 124. Such control may terminate the power provided at the AC inverter port (e.g., in response to the power consumption of a constant or variable air conditioner load exceeding a power consumption of 1,000 Watts, etc.) while still providing power to the USB port (e.g., allowing the use of the energy storage and power supply device 100 to charge and/or power cell phones or other lower-power consumption devices, etc.).

In another embodiment, the processing circuit 160 is configured to engage the first regulator 212 and the second regulator 214 (e.g., to terminate the power to both the first output 122 and the second output 124, etc.) in response to the rate that power is going out through the first output 122 and/or the second output 124 (individually or collectively) exceeding a predetermined threshold rate (e.g., 1,000 Watts, etc.). In still another embodiment, the processing circuit 160 is configured to engage the first regulator 212 (e.g., to terminate the power to the first output 122, etc.) in response to the rate that power is going out through the first output 122 and/or the second output 124 (individually or collectively) exceeding a first predetermined threshold rate (e.g., 1,000 Watts, etc.) and additionally engage the second regulator 214 (e.g., to terminate the power to both the first output 122 and the second output 124, etc.) in response to the rate that power is going out through the first output 122 and/or the second output 124 (individually or collectively) exceeding a second predetermined threshold rate (e.g., 1,200 Watts, etc.). By reducing, limiting, throttling, terminating, etc. the power provided at one or more of the outputs, the processing circuit 160 may be configured to protect the energy storage unit 140 from damage that may be caused by excessive power draw by load devices. The processing circuit 160 may additionally or alternatively be configured to otherwise selectively vary (e.g., reduce, limit, throttle, terminate, increase, boost, allow, provide, etc.) the electrical power output at one or more of the outputs based on the rate that the power is going out through one or more of the outputs (e.g., deactivate one or more outputs based on the charge level of the energy storage unit falling below a threshold value and the rate power is going out through one or more of the outputs exceeding a predetermined threshold rate, etc.). By way of example, the processing circuit 160 may be configured to enter the reserve mode and/or vary the power provided at one or more of the outputs once in the reserve mode based on the rate power is going out through one or more of the outputs.

In some applications, the processing circuit 160 is configured to provide and/or limit power based on a power being provided at the input interface 110 (e.g., by the power supply device 300, etc.). By way of example, the processing circuit 160 may be configured to determine the power to provide at the first output 122 and/or the second output 124 based on the power being provided at the input interface 110. The processing circuit 160 may additionally or alternatively be configured to determine the power to provide at the first output 122 and/or the second output 124 based on electrical losses associated with use of the energy storage and power supply device 100. By providing power (e.g., limiting the power, etc.) at the first output 122 and/or the second output 124 based on the power input at the input interface 110 and/or electrical losses may reduce the risk of depleting the energy storage unit 140. In other embodiments, the processing circuit 160 is configured to provide power independent of the power being provided at the input interface 110 and/or the power losses (e.g., allowing the energy storage unit 140 to be depleted, etc.).

One or more of the voltage ranges of the reserve module 184 may be dynamically adjusted. For example, the reserve module 184 may be configured to update, modify, add, or remove voltage ranges depending on the power supply device 300, the energy storage unit 140, the first external device 402, and/or the second external device 404. Further, the reserve module 184 may be configured to update, modify, add, or remove voltage ranges depending on a charge level of the energy storage unit 140. In some applications, the reserve module 184 may expand the voltage ranges in response to the energy storage unit 140 receiving electrical energy from the power supply device 300. Similarly, the reserve module 184 may reduce the voltage ranges in response to determining that the energy storage unit 140 is no longer receiving electrical energy from the power supply device 300.

According to an exemplary embodiment, the override module 186 is configured to selectively operate the energy storage and power supply device 100 in an override mode of operation. The override mode of operation may facilitate unrestricted operation of the energy storage unit 140. Unrestricted operation of the energy storage unit 140 may include the override module 186 overriding the reserve mode and/or a signal provided by the reserve module 184. Unrestricted operation of the energy storage unit 140 may additionally or alternatively include the override module 186 facilitating depletion of the energy storage unit 140 (e.g., beyond the second threshold value, etc.). Unrestricted operation of the energy storage unit 140 may additionally or alternatively include the override module 186 preventing the reserve mode from being activated. Unrestricted operation of the energy storage unit 140 may additionally or alternatively include the override module 186 increasing (e.g., from the reduced power, etc.), maintaining (e.g., preventing a reduction in power, etc.), activating (e.g., providing power after it was terminated, etc.), etc. the power provided at an output (e.g., the first output 122, the second output 124, etc.).

According to an exemplary embodiment, the override module 186 is configured to engage (e.g., start, activate, etc.) the override mode of operation of the energy storage and power supply device 100 in response to receiving an override indication. The override module 186 may thereby be configured to (i) override various thresholds (e.g., the threshold charge level, the threshold voltage, the threshold temperature, the threshold run time, the threshold time of day, etc.) set by the reserve module 184 (e.g., for a predetermined period of time, etc.), (ii) update, modify, or otherwise alter various thresholds set by the reserve module 184, and/or (ii) allow the energy storage unit 140 to operate until it is critically or fully depleted.

In some embodiments, the override indication (in response to which the override mode is initiated) is based on an operator input (e.g., user interaction, an operator manually engaging the override mode, provided at the user interface 40, etc.). By way of example, an operator may provide an input to the energy storage and power supply device 100 using a user interface (e.g., the user interface 40, etc.) to indicate that he or she desires to utilize all the available power of the energy storage unit 140 (i.e., prevent and/or deactivate the reserve mode of operation). By way of another example, an operator may provide an input to the energy storage and power supply device 100 using a remote user interface 500. The remote user interface 500 may be a portable user device such as a smartphone, tablet, laptop, smart watch, etc. that is capable of wirelessly connecting and communicating with the energy storage and power supply device 100 (e.g., via Wi-Fi, Bluetooth, ZigBee, cellular, radio, etc.). The energy storage and power supply device 100 may thereby include a wireless transceiver configured to receive the operator input from the remote user interface 500. The remote user interface 500 may alternatively be a stationary device such as a desktop computer or the like. The energy storage and power supply device 100 may be capable of connecting to the Internet (e.g., via a wireless or wired connection, etc.) and receive the operator input from the stationary device.

In some embodiments, the override indication is additionally or alternatively based on a signal indicating that an emergency situation has occurred, is currently occurring, and/or is about to occur (e.g., a power outage, severe weather, etc.). By way of example, the override module 186 may be configured to receive the signal from a weather service center (e.g., with a wireless and/or wired communication protocol, etc.) and/or a sensor positioned to monitor the weather (e.g., a temperature sensor, a wind sensor, a barometer, etc.). The signal may indicate that a severe storm or severe temperatures are present and/or will be present. For example, the temperature may be extremely high or low such that an heating, ventilation, and air conditioning (HVAC) system requires additional power to continue operating efficiently to provide a desired temperature to a conditioned space. By way of another example, the override module 186 may be configured to receive the signal from a sensor positioned to monitor a mains power supply that the energy storage and power supply device 100 may be associated with (e.g., as a backup power supply for a home or business, etc.). The override module 186 may be configured to initiate the override mode of operation in response to (i) a power outage occurring such that the energy storage unit 140 provides power to run various systems that the mains power supply was previously powering (e.g., prior to the power outage, etc.) and/or (ii) the operational characteristics of the energy storage unit 140 approaching one or more of the thresholds set by the reserve module 184. The override module 186 may thereby continue providing power to support or replace the mains power supply as needed and/or while the thresholds set by the reserve module 184 are exceeded. According to an exemplary embodiment, such control by the override module 186 may facilitate providing access to additional capacity of the energy storage unit 140 that would otherwise be restricted (e.g., by the reserve mode and/or the reserve module 184, etc.). By way of example, the override mode of operation may increase the autonomous run time of the energy storage and power supply device 10 from one day (e.g., when not in the override mode with the reserve mode available, etc.) to up to a five day run time (e.g., when the reserve mode is deactivated, without affecting the cycle life of the energy storage and power supply device 10, etc.).

In some embodiments, the override indication is additionally or alternatively based on a signal from a module configured to indicate that the energy storage unit 140 has more or less than a threshold lifetime usage. By way of example, the override module 186 may be configured to initiate the override mode of operation in response to the energy storage unit 140 having an available lifetime usage remaining that exceeds a threshold (e.g., the batteries are capable of withstanding the additional depletion and/or use, etc.).

In some embodiments, the override indication is additionally or alternatively based on how many overrides have previously occurred, the frequency of such overrides, and/or the period of time between such overrides. By way of example, the override module 186 may be configured to provide the override indication in response to the energy storage and power supply device 10 experiencing less than a threshold number of override events over their lifetime. By way of another example, the override module 186 may be configured to provide the override indication in response to a period of time between override events being greater than a threshold time (e.g., the overrides are sufficiently spaced apart in time, etc.).

In some embodiments, the override indication is additionally or alternatively based on a temperature of the energy storage unit 140. By way of example, the override module 186 may be configured to provide the override indication in response to the temperature of the energy storage unit 140 being less than a first threshold temperature (e.g., the batteries are relatively cool, etc.). Conversely, the override module 186 may be configured to prevent the override mode of operation from being initiated in response to the temperature of the energy storage unit 140 being greater than a second, higher threshold temperature (e.g., as operation above a certain temperature may cause damage to the energy storage unit 140, etc.).

In some embodiments, the override indication is additionally or alternatively based on the presence of and/or the amount of power provided at the input interface 110 (e.g., from the power supply device 300, a generator, a solar panel, a mains power supply, etc.). By way of example, the override module 186 may be configured to provide the override indication in response to an indication of power provided at the input interface 110 (e.g., based on sensor input, etc.). For example, the energy storage and power supply device 100 may have one or more load devices coupled to an output thereof (e.g., the first output 402, the second output 404, etc.), and the energy storage unit 140 may be depleted (e.g., beyond a threshold charge level, etc.). Such depletion may prevent the charging and/or use of the one or more load devices (e.g., due to the reserve mode, by the reserve module 184, etc.). However, upon receiving an indication of power provided at the input interface 110, the override module 186 may be configured to facilitate powering the one or more load devices (e.g., by passing the power directly through the energy storage and power supply device 100 to the output of the energy storage and power supply device 100, etc.).

According to the exemplary embodiment shown in FIG. 3, the energy storage and power supply device 10 includes a display, shown as display 220. In one embodiment, the display 220 includes an LCD screen. The reserve module 184 may be configured to provide data for representation on the display 220. The data may relate to which outputs (e.g., the I/O ports 48, etc.) are associated with one or more voltage ranges. The data may additionally or alternatively relate to one or more estimated remaining use times for specific outputs (e.g., the I/O ports 48, etc.). The reserve module 184 may be configured to determine the estimated remaining use time based on the current draw at the particular output and/or based on a rate at which the charge level of the energy storage unit is changing.

The display 220 may additionally or alternatively include one or more indicators (e.g., lighted rings surrounding one or more of the I/O ports 48, lights within and/or alongside one or more of the I/O ports, etc.) configured to convey data to a user. The display module 182 may be configured to receive data from the reserve module 184 regarding which of the outputs (e.g., which of the I/O ports 48, etc.) are active and/or may provide power and engage corresponding indicators to convey information regarding which of the outputs the processing circuit 160 is configured to provide power at (e.g., based on a charge level of the energy storage unit 140, etc.). By way of example, the display module 182 may provide commands such that lighted rings are illuminated around those outputs (e.g., I/O ports 48, etc.) that may be used to power an external device.

According to another exemplary embodiment, the display module 182 is configured to interpret the input current data (e.g., acquired and/or calculated based on data provided by the input current sensor 192, etc.) and/or the input voltage data (e.g., acquired and/or calculated based on data provided by the input voltage sensor 194, etc.) at the input interface 110 of the energy storage and power supply device 100. The display module 182 may be configured to calculate the electrical power provided by the power supply device 300. In one embodiment, the display module 182 is configured to calculate the electrical power provided by the power supply device 300 by multiplying the input current with the input voltage (e.g., acquired and/or calculated based on data provided by the input current sensor 192, the input voltage sensor 194, etc.). The display module 182 may provide the electrical power data for presentation on a display 162. In other embodiments, the display module 182 provides a current charge level of the energy storage unit for presentation on the display 162.

Depending on the application, the power supply device 300 may be any suitable generator (e.g., gasoline generator, diesel generator, natural gas generator, propane generator, etc.), a connection to an electrical power grid (e.g., via an outlet, via a wall plug, etc.), or through the use of an additional energy storage unit. For example, the power supply device 300 may be a standard car battery. In other applications, the power supply device 300 may be a solar trough assembly, a bioreactor, a gasifier, or a fuel cell. Similarly, other systems, mechanisms, and devices for generating electricity may also be used. The electrical power from the power supply device 300 may be used by the energy storage and power supply device 100 to at least one of charge and power a load device (e.g., a phone, a tablet, a computer, a portable and rechargeable battery pack, etc.). Similarly, the electrical power from the power supply device 300 may be used by the energy storage and power supply device 100 to power an appliance (e.g., a refrigerator, a freezer, an air conditioner, a heater, an air filtration system, a water filtration system, a desalination system, a washing machine, a fan, a dryer, a toaster, etc.), a medical device (e.g., a dialysis machine, a heart monitor, a respirator, etc.), a power generator device (e.g., a generator, etc.), and other similar devices, machines, and systems. In some embodiments, the electrical power from the power supply device 300 can be used to jump start a car or truck, charge an electric fuel cell, or to provide electrical power to an electric grid (e.g., an electric grid for a home, apartment, condominium, trailer, etc.).

Figure 4:
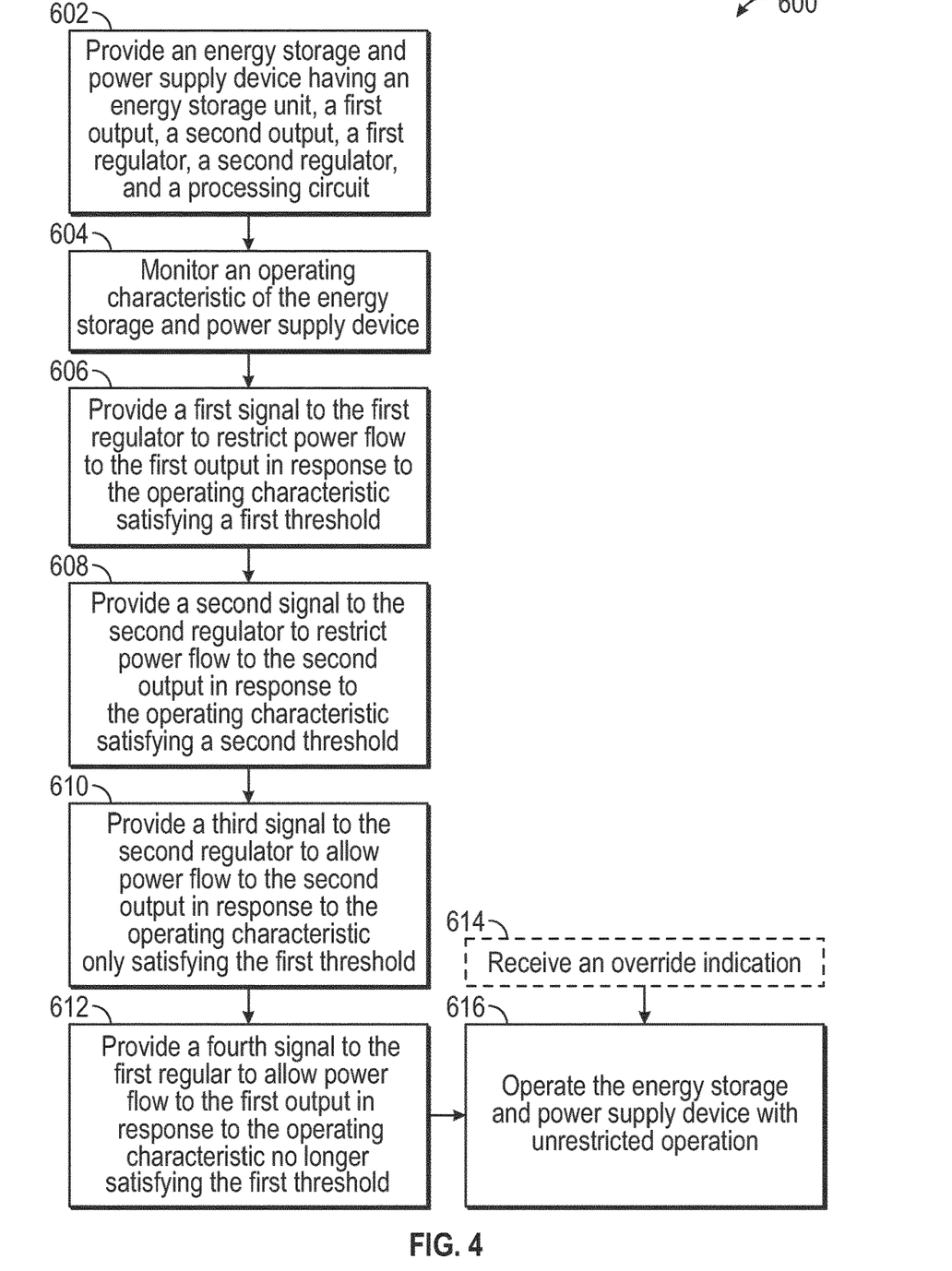
FIG. 4 is a flow diagram of a method for operating an energy storage and power supply device in a reserve mode and an override mode, according to an exemplary embodiment.

Referring now to FIG. 4, a method 600 for operating an energy storage and power supply device in a reserve mode and an override mode is shown, according to an exemplary embodiment. At step 602, an energy storage and power supply device (e.g., the energy storage and power supply device 10, the energy storage and power supply device 100, etc.) including an energy storage unit (e.g., the energy storage unit 30, the energy storage unit 140, etc.), a first output (e.g., the first output 122, etc.) coupled to the energy storage unit, a second output (e.g., the second output 124, etc.) coupled to the energy storage unit, a first regulator (e.g., the first regulator 212, etc.) positioned along a first power flow path between the energy storage unit and the first output, a second regulator (e.g., the second regulator 214, etc.) positioned along a second power flow path between the energy storage unit and the second output, and a processing circuit (e.g., the processing circuit 160, etc.) coupled to the first regulator and the second regulator is provided. At step 604, the processing circuit is configured to monitor an operating characteristic of the energy storage and power supply device (e.g., with the charge sensor 200, the input current sensor 192, the input voltage sensor 194, the output current sensor 196, the output voltage sensor 198, the temperature sensor, the timer, etc.). The operating characteristic may include at least one of a voltage, a current, a state of charge, a power draw, a power input, a run time, and/or a temperature of the energy storage and power supply device.

At step 606, the processing circuit is configured to provide a first signal to the first regulator to restrict power flow to the first output in response to the operating characteristic satisfying a first threshold such that the energy storage and power supply device operates in a reserve mode. By way of example, the voltage or state of charge of the energy storage unit may drop below a first voltage threshold (e.g., 10.5 V, etc.) and/or a first charge threshold. By way of another example, the power output or draw rate may exceed a first rate threshold. By way of yet another example, the temperature of the energy storage and power supply device may exceed a first temperature threshold. By way of still another example, the power input may drop below a first power input threshold.

At step 608, the processing circuit is configured to provide a second signal to the second regulator to restrict power flow to the second output in response to the operating characteristics satisfying a second threshold (e.g., such that the energy storage and power supply device stops providing power completely, etc.). By way of example, the voltage or state of charge of the energy storage unit may drop below a second voltage threshold (e.g., 9 V, etc.) and/or a second charge threshold. By way of another example, the power output or draw rate may exceed a second rate threshold. By way of yet another example, the temperature of the energy storage and power supply device may exceed a second temperature threshold. By way of still another example, the power input may drop below a second power input threshold.

At step 610, the processing circuit is configured to provide a third signal to the second regulator to allow power flow to the second output in response to the operating characteristic only satisfying the first threshold such that the energy storage and power supply device operates in the reserve mode. By way of example, the energy storage unit may have sufficiently charged such that the voltage and/or state of charge thereof exceeds the corresponding second threshold. By way of another example, the rate of draw of power may have reduced below the second threshold (e.g., a device was disconnected from the first and/or second power outputs, etc.). At step 612, the processing circuit is configured to provide a fourth signal to the first regulator to allow power flow to the first output in response to the operating characteristic no longer satisfying the first threshold.

In some embodiments, method 600 includes step 614. At step 614, the processing circuit receives an override indication to operate the energy storage and power supply device in an override mode. The override indication may be provided such that the processing circuit prevents or stops limiting the power output at the first output and/or the second output irrespective of the operating characteristic of the energy storage and power supply device. The override indication may be provided before or after step 606, 608, step 610, and/or step 612. The override indication may be (i) manually inputted by an operator using a user interface of the energy storage and power supply device (e.g., the user interface 40, etc.) and/or a remote device (e.g., remote user interface 500, etc.) or (ii) automatically received based on sensor input (e.g., indicating an emergency situation, etc.). At step 616, the processing circuit is configured to operate the energy storage and power supply device with unrestricted operation (e.g., in the override mode in response to receiving the override indication, in a normal mode in response to the operating characteristic not satisfying either of the first and second thresholds, etc.).

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as may be recited in appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the energy storage and power supply system as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

The invention claimed is:

1. An energy storage and power supply device comprising:
    an energy storage unit configured to store electrical energy;
    an output coupled to the energy storage unit, the output configured to facilitate providing power from the energy storage unit to a load; and
    a processing circuit configured to selectively restrict a power flow provided to the output by the energy storage unit in response to an operating characteristic of the energy storage and power supply device satisfying a threshold condition.

2. The energy storage and power supply device of claim 1, wherein the operating characteristic is a voltage of the energy storage unit, and wherein the processing circuit is configured to selectively restrict the power flow provided to the output by the energy storage unit in response to the voltage of the energy storage unit falling below a voltage threshold.

3. The energy storage and power supply device of claim 1, wherein the operating characteristic is a state of charge of the energy storage unit, and wherein the processing circuit is configured to selectively restrict the power flow provided to the output by the energy storage unit in response to the state of charge of the energy storage unit falling below a state of charge threshold.

4. The energy storage and power supply device of claim 1, wherein the operating characteristic is a rate of power draw from the energy storage unit, and wherein the processing circuit is configured to selectively restrict the power flow provided to the output by the energy storage unit in response to the rate of power draw from the energy storage unit exceeding a draw rate threshold.

5. The energy storage and power supply device of claim 1, wherein the operating characteristic is a power input to the energy storage unit, and wherein the processing circuit is configured to selectively restrict the power flow provided to the output by the energy storage unit in response to the power input to the energy storage unit falling below an input threshold.

6. The energy storage and power supply device of claim 1, wherein the operating characteristic is a temperature of the energy storage unit, and wherein the processing circuit is configured to selectively restrict the power flow provided to the output by the energy storage unit in response to the temperature of the energy storage unit exceeding a temperature threshold.

7. The energy storage and power supply device of claim 1, wherein the operating characteristic is a run time of the energy storage and power supply device, and wherein the processing circuit is configured to selectively restrict the power flow provided to the output by the energy storage unit in response to the run time of the energy storage and power supply device exceeding a run time threshold.

8. The energy storage and power supply device of claim 1, wherein the operating characteristic is a time of day, and wherein the processing circuit is configured to selectively restrict the power flow provided to the output by the energy storage unit in response to the time of day surpassing a time of day threshold.

9. The energy storage and power supply device of claim 1, further comprising a sensor positioned to acquire data regarding the operating characteristic, wherein the processing circuit is configured to receive the data from the sensor.

10. The energy storage and power supply device of claim 1, wherein the processing circuit is configured to at least one of receive or generate an override indication to operate the energy storage unit in an override mode to at least one of prevent or override the reserve mode, irrespective of the operating characteristic.

11. The energy storage and power supply device of claim 10, further comprising a user interface, wherein the processing circuit is configured to receive the override indication from the user interface in response to a user input provided thereto.

12. The energy storage and power supply device of claim 10, wherein the processing circuit is configured to receive the override indication from an external device.

13. The energy storage and power supply device of claim 10, wherein the processing circuit is configured to generate the override indication in response to at least one of identifying or receiving an indication regarding at least one of an emergency situation, a remaining lifetime of the energy storage unit, a number of previous overrides, a frequency of previous overrides, a period between previous overrides, a temperature, a presence of power being provided to an input of the energy storage and power supply device, or an amount of power being provided to the input.

14. The energy storage and power supply device of claim 10, further comprising a regulator positioned along a flow path between the energy storage unit and the output, wherein the regulator is configured to facilitate selectively restricting the power flow.

15. The energy storage and power supply device of claim 1, wherein the output comprises a first output and a second output, wherein the processing circuit is configured to selectively restrict the power flow provided to (i) the first output in response to the operating characteristic satisfying a first threshold condition and (ii) the second output in response to the operating characteristic satisfying a second threshold condition that is different than the first threshold condition.

16. A method for operating an energy storage and power supply device, the method comprising:
 monitoring, by a processing circuit, an operating characteristic of the energy storage and power supply device; and
 providing, by the processing circuit, a first signal to a first regulator of the energy storage and power supply device to limit a first power flow from an energy storage unit of the energy storage and power supply device to a first output of the energy storage and power supply device in response to the operating characteristic satisfying a first threshold value such that the energy storage and power supply device operates in the reserve mode.

17. The method of claim 16, further comprising providing, by the processing circuit, a second signal to a second regulator of the energy storage and power supply device to limit a second power flow from the energy storage unit to a second output of the energy storage and power supply device in response to the operating characteristic satisfying a second threshold value that is different than the first threshold value.

18. The method of claim 16, further comprising providing, by the processing circuit, an override signal the first regulator to at least one of prevent limiting or stop limiting the first power flow provided to the first output, irrespective of the operating characteristic.

19. The method of claim 16, further comprising dynamically adjusting, by the processing circuit, the first threshold value based on at least one of a power input to the energy storage unit, a power draw from the energy storage unit, or a state of charge of the energy storage unit.

20. A control system for an energy storage and power supply device, the control system comprising:
 a processing circuit configured to:
  monitor an operating characteristic of the energy storage and power supply device; and
  provide a reserve signal to a regulator positioned between an energy storage unit and an output of the energy storage and power supply device such that the regulator modulates a power flow provided to the output in response to the operating characteristic satisfying a threshold condition such that the energy storage and power supply device operates in a reserve mode.

* * * * *